United States Patent
Yanagita

(10) Patent No.: US 8,671,816 B2
(45) Date of Patent: Mar. 18, 2014

(54) TOOTHED CABLE, CABLE DEVICE PROVIDED WITH A TOOTHED CABLE, AND SYSTEM FOR MOVING A MOVING OBJECT, SAID SYSTEM PROVIDED WITH A TOOTHED CABLE

(75) Inventor: Takashi Yanagita, Takarazuka (JP)

(73) Assignee: Hi-Lex Corporation, Hyogo (JP)

( * ) Notice: Subject to any disclaimer, the term of this patent is extended or adjusted under 35 U.S.C. 154(b) by 53 days.

(21) Appl. No.: 13/498,024

(22) PCT Filed: Sep. 16, 2010

(86) PCT No.: PCT/JP2010/066070
§ 371 (c)(1),
(2), (4) Date: Mar. 23, 2012

(87) PCT Pub. No.: WO2011/037070
PCT Pub. Date: Mar. 31, 2011

(65) Prior Publication Data
US 2013/0000470 A1    Jan. 3, 2013

(30) Foreign Application Priority Data
Sep. 25, 2009 (JP) .................... 2009-221319

(51) Int. Cl.
*D04C 1/06*       (2006.01)
(52) U.S. Cl.
USPC ................................ 87/13; 57/210
(58) Field of Classification Search
USPC ................ 57/210, 230; 87/1, 8, 13
See application file for complete search history.

(56) References Cited

U.S. PATENT DOCUMENTS

| | | | | |
|---|---|---|---|---|
| 2,211,790 | A * | 8/1940 | Pile | 74/502.6 |
| 4,411,168 | A * | 10/1983 | Yoshifuji | 74/502.5 |
| 4,849,038 | A * | 7/1989 | Burghardt et al. | 156/172 |
| 5,010,723 | A * | 4/1991 | Wilen | 57/210 |
| 5,239,890 | A * | 8/1993 | Sosnoski et al. | 74/501.5 R |
| 5,487,941 | A * | 1/1996 | Pepin | 428/364 |
| 5,577,416 | A * | 11/1996 | Fukura et al. | 74/502.5 |
| 5,651,168 | A * | 7/1997 | Tung et al. | 28/220 |
| 7,559,189 | B2 * | 7/2009 | Honda et al. | 57/223 |
| 2003/0196508 | A1* | 10/2003 | Uenaka et al. | 74/502.5 |
| 2003/0205041 | A1* | 11/2003 | Baker, Jr. | 57/224 |
| 2004/0020184 | A1* | 2/2004 | Bowers | 57/228 |
| 2005/0081504 | A1* | 4/2005 | Bowers | 57/3 |
| 2007/0209467 | A1* | 9/2007 | Honda et al. | 74/500.5 |

FOREIGN PATENT DOCUMENTS

| | | |
|---|---|---|
| JP | 47-46284 | 11/1972 |
| JP | 55-68712 U | 11/1978 |
| JP | 61-12946 A | 1/1986 |
| JP | 61-191557 U | 11/1986 |
| JP | 63-28991 A | 2/1988 |
| JP | 6-294460 A | 10/1994 |
| JP | 2006-192745 A | 7/2006 |

* cited by examiner

Primary Examiner — Shaun R Hurley
(74) Attorney, Agent, or Firm — Global IP Counselors, LLP

(57) ABSTRACT

A toothed cable is provided in which a strand can be securely joined to a core cable while maintaining flexibility of the strand. The toothed cable includes the core cable, a wire disposed spirally around the core cable at a fixed pitch, and the strand having a core thread and piles fixed to the core thread, the strand being disposed spirally along a groove having side walls and a bottom formed by the wire and the core cable. The toothed cable is obtained by a manufacturing method of disposing a meltable filament thread in the groove, disposing the strand in the groove with tension after the filament thread is disposed, melting the filament thread after the strand is disposed, and joining the strand to the core cable by solidifying the melted filament thread.

20 Claims, 3 Drawing Sheets

TOOTHED CABLE, CABLE DEVICE PROVIDED WITH A TOOTHED CABLE, AND SYSTEM FOR MOVING A MOVING OBJECT, SAID SYSTEM PROVIDED WITH A TOOTHED CABLE

CROSS-REFERENCE TO RELATED APPLICATIONS

This application is a U.S. National stage application of International Application No. PCT/JP2010/066070, filed Sep. 16, 2010, which claims priority claims priority under 35 U.S.C. §119(a) to Japanese Patent Application No. 2009-221319, filed in Japan on Sep. 25, 2009, the entire contents of which is hereby incorporated by reference.

TECHNICAL FIELD

The present invention relates to a toothed cable, a cable device including the toothed cable, and a system for moving a moving object.

BACKGROUND

Conventionally, a toothed cable is constituted of a core cable and a wire disposed spirally around the core cable at a fixed pitch. The toothed cable has flexibility, and the wire is engaged with a gear so that the toothed cable is used as a toothed cable rack for converting rotation of the gear into linear motion of the toothed cable. The toothed cable moves along a guide member that is curved as necessary, and an end of the toothed cable is connected to a moving object, such as a sunroof or a window glass of a vehicle, so as to be used as a system for moving the moving object. There is known a toothed cable including a braid disposed in a groove formed of the core cable and the wire so that, instead of the wire, the braid contacts with an inner surface of the guide member, thereby reducing a noise generated from the sliding between surface of the wire of the toothed cable and the inner surface of the guide member.

Japanese Laid-Open Application Publication No. 63-28991 (Patent Document 1) discloses a toothed cable including an intermediate layer obtained by heating a core cable and a spiral wire, disposing a braid made of a thermoplastic resin in the groove, and melting and fixing the braid by the heat of the core cable and the wire.

Further, Japanese Laid-Open Application Publication No. 6-294460 (Patent Document 2) discloses a toothed cable in which a braid having piles formed radially around a core thread with adhesive is disposed in the groove to be fixed with adhesive.

SUMMARY

However, the toothed cable described in Patent Document 1 has the following problem. Because the core cable and the wire are heated to a temperature higher than the melting point of the braid so as to melt the braid in contact with the wire, the braid is melt to adhere not only to the core cable but also to the wire. Therefore, the adhesion area increases, and lengths of piles are shortened due to the melting and adhering so that flexibility of the braid may be deteriorated.

In addition, the toothed cable described in Patent Document 2 has a problem that if the amount of the adhesive applied to the core cable is large, flexibility of the braid may be deteriorated because the adhesive enters between the piles and is solidified with the piles. On the contrary, if the amount of the adhesive is small, it would be difficult to adjust the application amount of the adhesive and, as a result, joining between the core cable and the braid may be off due to an uneven application of the adhesive.

The toothed cable of present disclosure is conceived in view of the above-mentioned problem, and an object thereof is to provide a toothed cable in which a strand can be securely joined to the core cable while maintaining flexibility of the braid.

A toothed cable of the present disclosure includes a core cable, a wire disposed spirally around the core cable at a fixed pitch, and a strand having a core thread and piles fixed to the core thread, the strand being disposed spirally along a groove having side walls and a bottom, the side walls and the bottom being formed by the wire and the core cable. The toothed cable is obtained by a manufacturing method including a filament thread disposing step of disposing a meltable filament thread in the groove, a strand disposing step of disposing the strand in the groove with tension after the filament thread is disposed, a filament thread melting step of melting the filament thread after the strand is disposed, and a joining step of joining the strand to the core cable by solidifying the melted filament thread.

(1) The disclosed toothed cable can be obtained by the manufacturing method including a filament thread disposing step of disposing a meltable filament thread in the groove, a strand disposing step of disposing the strand in the groove with tension after the filament thread is disposed, a filament thread melting step of melting the filament thread after the strand is disposed, and a joining step of joining the strand to the core cable by solidifying the melted filament thread. Therefore, the strand can be securely joined to the core cable while maintaining flexibility of the strand.

(2) If the filament thread is constituted by binding plural filaments together, the filaments are spread on the bottom surface of the groove when they are disposed in the groove. Therefore, the joining area between the core cable and the strand is increased and the strand can be securely joined to the core cable.

(3) If the filament thread is constituted of a single filament having a width larger than its height, the surface of the wider side is used for joining the core cable and the strand so that the joining area between the core cable and the strand is increased. Thus, the core cable and the strand can be securely joined.

(4) If the melting point of the filament thread is lower than the melting point of the strand, the strand is not melted when the temperature reaches the melting point of the filament thread. Therefore, flexibility of the braid can be maintained.

(5) If a distance between the center of the core thread and the bottom surface of the groove is smaller than a distance between the center of the core thread and tips of the piles before being disposed in the groove, the piles between the core thread and the bottom surface of the groove become tight so that the joining area is increased. Therefore, the core cable and the strand can be securely joined.

(6) If the filament thread and the core thread are disposed close to one of the side walls in the groove, the gear would hardly contact with the core thread when the gear and the wire are engaged with each other. Therefore, it is possible to prevent the core thread from being worn out and broken from the contact between the core thread and the gear.

BRIEF DESCRIPTION OF THE DRAWINGS

Referring now to the attached drawings which form a part of this original disclosure.

DETAILED DESCRIPTION OF EMBODIMENTS

Figure 1:
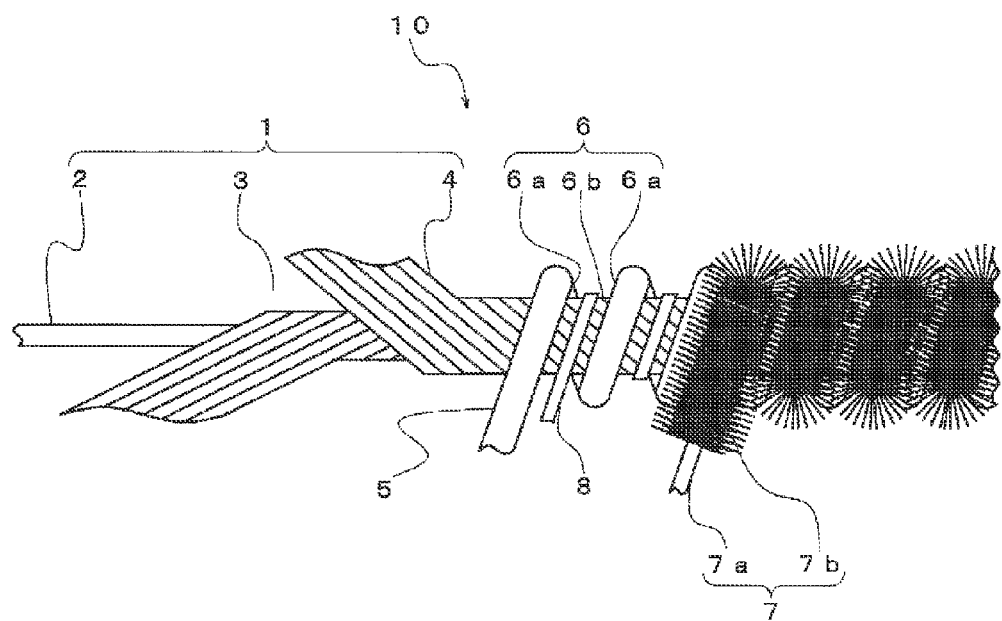
FIG. 1 is a partially cutaway side view of a toothed cable according to a first illustrative embodiment.
Figure 2:
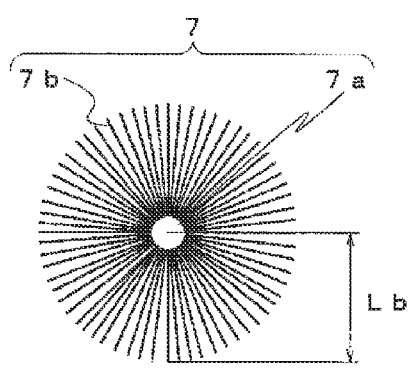
FIG. 2 is a cross section illustrating an example of a strand according to the first illustrative embodiment.
Figure 3:
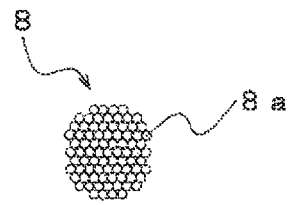
FIG. 3 is a cross section illustrating an example of a filament thread according to the first illustrative embodiment.
Figure 4A:
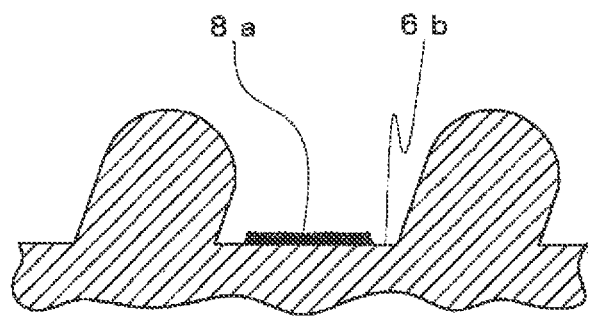
FIG. 4A is an explanatory diagram illustrating a state where the filament thread is disposed in a groove according to the first illustrative embodiment.
Figure 4B:
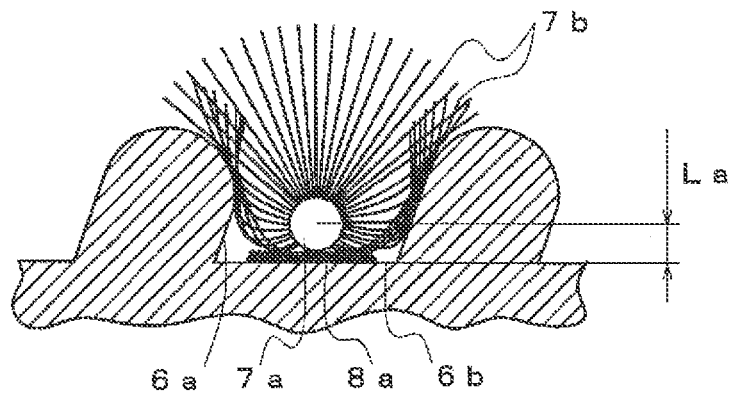
FIG. 4B is an explanatory diagram illustrating a state where the strand is disposed on the filament thread according to the first illustrative embodiment.
Figure 5A:
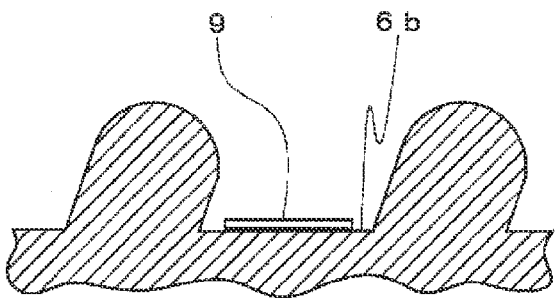
FIG. 5A is an explanatory diagram illustrating a state where another filament thread is disposed in the groove according to the first illustrative embodiment
Figure 5B:
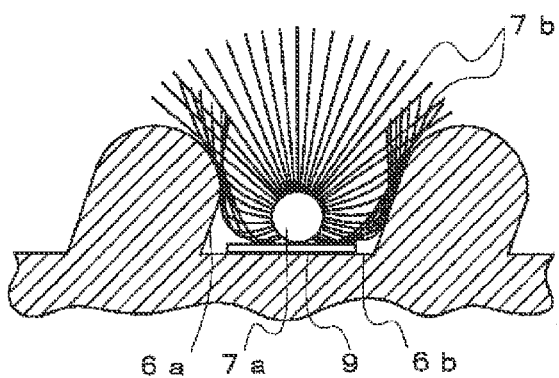
FIG. 5B is an explanatory diagram illustrating a state where the strand is disposed on another filament according to another illustrative embodiment.
Figure 6:
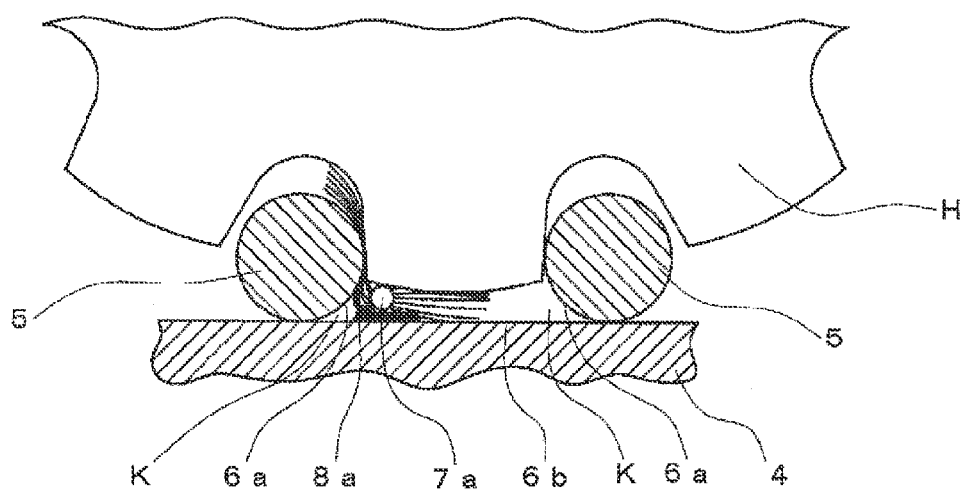
FIG. 6 is an explanatory diagram illustrating a state where the strand is disposed on the filament thread according to another illustrative embodiment.

Hereinafter, a toothed cable 10 according to an embodiment of the present invention is described with reference to the drawings. FIG. 1 is a partially cutaway side view of a toothed cable 10 according to a first embodiment. FIG. 2 is a cross section illustrating an example of a strand according to the first embodiment. FIG. 3 is a cross section illustrating an example of a filament thread according to the first embodiment of. FIG. 4A is an explanatory diagram illustrating a state where the filament thread is disposed in a groove according to the first embodiment. FIG. 4B is an explanatory diagram illustrating a state where the strand is disposed on the filament thread according to first the embodiment. FIG. 5A is an explanatory diagram illustrating a state where another filament thread is disposed in the groove according to the embodiment. FIG. 5B is an explanatory diagram illustrating a state where the strand is disposed on another filament thread according to the embodiment. And FIG. 6 is an explanatory diagram illustrating a state where the strand is disposed on the filament thread according to another embodiment.

As illustrated in FIG. 1, a core cable 1 includes a core wire 2 that is a linear galvanized hard steel wire having a diameter of 0.6 to 0.8 mm, a lower layer 3 constituted of six galvanized hard steel wires having a diameter of 0.4 to 0 6 mm wound around the core wire 2, and an upper layer 4 constituted of six galvanized hard steel wires having a diameter of 0.4 to 0 6 mm wound around the lower layer 3 in an opposite direction to that of the lower layer 3. Around the upper layer 4, there is disposed a wire 5 that is a galvanized hard steel wire having a diameter of 1.0 to 1.2 mm disposed spirally at a fixed pitch of 2.4 to 2.6 mm in the same direction as the lower layer 3.

A groove 6 formed by the core cable 1 and the wire 5 is formed spirally of side walls 6a and a bottom 6b. The side walls 6a are outer surfaces of the wire 5, and the bottom 6b is an outer surface of the core cable 1. A strand 7 described later is disposed in the groove 6.

The strand 7 is constituted of a core thread 7a and piles 7b as illustrated in FIG. 2. As the core thread 7a, a plurality of synthetic resin fibers bound together may be used, and which may be made of nylon 6, nylon 66, polyester, cellulose or the like. As the piles 7b, a synthetic resin fiber may be used, and which may be made of nylon 6, nylon 66, nylon 6.10, nylon 6.12, polyester, or the like having a thickness of 25 to 40 μm and a length 1.5 to 2.0 mm, but does not have to be limited to these ranges.

As a manufacturing method of the strand 7, a method including applying adhesive to the core thread 7a, and fixing the piles 7b to the core thread 7a radially by electrostatic flocking or the like may be used. It is possible to use other known methods such as a method including disposing piles between two core threads in the direction perpendicular to the core threads, and twisting the two core threads so that the piles are fixed to the core threads.

A filament thread 8 is constituted of a plurality of filaments 8a bound together, as illustrated in FIG. 3, and a cross section of the filament thread 8 has a substantially circular shape. As the filament 8a, meltable synthetic resin having a lower melting point than the strand 7 may be used, such as nylon 6, nylon 66, nylon 6.10, nylon 6.12, nylon 12, a copolymer nylon of these, polyester, polyurethane, ethylene vinyl acetate, or the like. 30 to 90 filaments may be bound together, each of which has a diameter of 20 to 80 μm. Note that the filament thread 8 may also be constituted of a single filament 9 having a width larger than its height (see FIG. 5A).

Next, a manufacturing method of the toothed cable 10 of the present disclosure is described. First, a feeding device of the filament thread 8 is rotated while the core cable 1 and the wire 5 are restricted so as to not rotate, such that the filament thread 8 is disposed to contact with the bottom 6b of the groove, while applying a tension to the filament thread 8. In this case, the filaments 8a constituting the filament thread 8 spread laterally so that the thickness of the filament thread 8 is decreased (see FIG. 4A). In this way, the joining area between the core cable 1 and the strand 7 can be increased. In addition, because the cross section has a substantially circular shape, the filament thread 8 can be supplied without considering the orientation thereof, but other cross sectional shapes can also be adopted. Note that if the filament thread 8 is constituted of the filament 9 having a width larger than its height, the joining area between the core cable 1 and the strand 7 can be increased by disposing the surface having a larger surface area to be facing the core cable 1 (see FIG. 5B).

Next, similarly to when the filament thread 8 is disposed, a feeding device of the strand 7 is rotated while the core cable 1, the wire 5, and the filament thread 8 are restricted so as to not rotate. Thus, the strand 7 is disposed with tension such that the core thread 7a contacts with the surface of the filament thread 8. The tension when the strand 7 is disposed is set so that the piles between the core thread 7a and the filament thread 8 are curved, and that a distance La between the center of the core thread 7a and the bottom 6b of the groove becomes smaller than a distance Lb between the center of the core thread 7a and the tips of the piles 7b before being disposed (see FIG. 2) as illustrated in FIG. 4B. In this case, the piles 7b experience a stress, which corresponds to a restoring force to be back to the straightened state. In addition, because the position of the piles 7b is restricted by the side walls 6a and the bottom 6b of the groove, the piles 7b become tight between the core thread 7a and the bottom 6b, so that the joining area can be increased.

Next, while maintaining the tension, the core cable 1 and the wire 5 are heated by a high frequency induction heating apparatus or a heating furnace to a temperature at which the filament thread 8 is melted. By this heating, only the filament thread 8 is melted and enters recesses on the surface of the upper layer 4 of the core cable 1, recesses on the core thread 7a on the bottom 6b side, and gaps between the piles 7b, so that the core cable 1 and the strand 7 are connected to each other. Because the filaments 8a are disposed on the bottom 6b side in advance, the melted filament thread 8 does not migrate to the tips of the piles 7b, so that flexibility of the strand can be maintained after the solidification. Further, if the heating is performed to a temperature at which the piles 7b are softened, the stress corresponding to the restoring force to bring the piles back to the straightened state is removed, so that the relationship of La<Lb of the core thread 7a can be maintained easily. In addition, by setting the melting point of the synthetic resin used for the filament thread to be lower than the melting point of the synthetic resin used for the strand, the strand is not melted and maintains its shape even when it reaches a temperature at which the filament thread is melted. Therefore, flexibility of the braid can be maintained.

Finally, the filament thread 8 is kept at room temperature to be solidified. The filament thread 8 maintains in the state in which the core cable 1 and the braid 7 are connected to each other, and the piles 7b maintains the relationship of La<Lb of the core thread 7a. The filament thread 8 become hardened then. Thus, the stress corresponding to the restoring force to bring the piles 7b back to the straightened state is removed, and the core cable 1 and the strand 7 are joined to each other while maintaining the relationship of La<Lb and the flexibility of the piles. Note that when the filament thread 8 is to be solidified, it is possible to use a forced cooling method.

Note that when the filament thread 8 and the core thread 7a are disposed at the bottom 6b of the groove, if they are disposed close to one of the side walls 6a in the groove 6, a gear H would hardly contact with the core thread 7a when the gear H engages with the wire 5 as illustrated in FIG. 6. Therefore, it is possible to prevent the core thread from being worn out and broken from the contact between the core thread 7a and the gear H. In particular, if the wire 5 has a circular cross section, a hollow K is formed on the bottom 6b side between the side wall 6a and the bottom 6b. Therefore, by disposing the filament thread 8 and the core thread 7a near the hollow K, it is easy to avoid the contact between the gear H and the core thread 7a.

Materials of the core cable, the wire, the filament thread, and the strand, the shape of the groove, and the like can be appropriately selected depending on the need. For instance, a toothed cable was manufactured by the steps including: disposing the galvanized hard steel wire having a diameter of 1.2 mm around the galvanized hard steel wire serving as the core cable at a pitch of 2.54 mm, so as to form the groove having a width of 1.34 mm and a depth of 1.2 mm; disposing in the groove the filament thread having a circular cross section and a linear density of 880 decitex, which is constituted of 80 filaments bound together, each of which being made of copolymer nylon of nylon 12 having a diameter of 35 µm; disposing the strand, in which the piles made of nylon 6 having an outer diameter of 28.6 µm and a length of 1.8 mm are formed by electrostatic flocking around the core thread having a linear density of 470 decitex and constituted of fibers bound together, each being made of nylon 6 having higher melting point than the filament thread; heating for two seconds at approximately 140 degrees, which is higher than the melting point of the filaments and lower than the melting point of the strand, so as to remove the stress of the piles by melting the filament thread and softening the strand; and leaving the resulted outcome naturally so that the filament thread is cured and the strand is solidified. As to the obtained toothed cable, it was confirmed that the strand was securely joined to the core cable while the flexibility of the strand was maintained.

The toothed cable may be inserted into a guide member such as a tube made of metal or synthetic resin that is curved as necessary and has an inner diameter larger than the outer diameter of the wire or a guide having a U-shaped cross section with a width and a height larger than the outer diameter of the wire, so as to be used as a cable device moving in the guide member.

In addition, the toothed cable may be connected at an end thereof to a moving object such as a sunroof, a window glass, a sheet, or a sliding door of a vehicle, or a windshield of a motorbike, so as to be used as a drive system that converts a rotational motion of a gear into a linear motion of the moving object. The present invention, however, is not to be limited to the above-mentioned moving objects.

The invention claimed is:

1. A toothed cable comprising:
a core cable;
a wire disposed spirally around the core cable at a fixed pitch; and
a strand having a core thread and piles fixed to the core thread, the strand being disposed spirally along a groove having side walls and a bottom, the side walls and the bottom being formed by the wire and the core cable, and the piles extending radially outward from the core thread such that a spacing between distal ends of the piles about the circumference of the core thread is larger than a spacing between proximal ends of the piles proximate to the core thread;
the toothed cable being obtained by a manufacturing method including:
disposing a meltable filament thread in the groove,
disposing the strand in the groove with tension, after the filament thread is disposed,
melting the filament thread after the strand is disposed, and
joining the strand to the core cable by solidifying the melted filament thread.

2. The toothed cable according to claim 1, wherein the filament thread includes a plurality of filaments bound together.

3. The toothed cable according to claim 1, wherein the filament thread includes a single filament having a width larger than a height thereof.

4. The toothed cable according to claim 1, wherein the melting point of the filament thread is lower than the melting point of the strand.

5. The toothed cable according to claim 1, wherein a distance between the center of the core thread and the bottom of the groove is smaller than a distance between the center of the core thread and the distal ends of the piles before being disposed in the groove.

6. The toothed cable according to claim 1, wherein the filament thread and the core thread are disposed close to one of the side walls in the groove.

7. A cable device comprising the toothed cable according to claim 1.

8. A system for moving a moving object comprising the toothed cable according to claim 1.

9. A manufacturing method of a toothed cable, the method comprising:
disposing a wire spirally around a core cable at a fixed pitch;
disposing a meltable filament thread in a groove having side walls and a bottom formed by the wire and the core cable;
disposing in the groove with tension a strand having a core thread and piles fixed to the core thread, the piles extending radially outward from the core thread such that a spacing between distal ends of the piles about the circumference of the core thread is larger than a spacing between proximal ends of the piles proximate to the core thread;

melting the filament thread; and joining the strand to the core cable by solidifying the melted filament thread.

10. The manufacturing method of a toothed cable according to claim 9, wherein a bundle of filaments is used as the filament thread.

11. The manufacturing method of a toothed cable according to claim 9, wherein the filament thread has a width larger than a height.

12. The manufacturing method of a toothed cable according to claim 11, wherein the filament thread is a single filament.

13. The manufacturing method of a toothed cable according to claim 9, wherein a melting point of the filament thread is lower than a melting point of the strand.

14. A toothed cable comprising:

a core cable;

a wire disposed spirally around the core cable at a fixed pitch; and a strand having a core thread and piles fixed to the core thread, the strand being disposed spirally along a groove having side walls and a bottom formed by the wire and the core cable, a distance between the center of the core thread and the bottom being smaller than a distance between the center of the core thread and tips of the piles before being disposed in the groove, and the piles extending radially outward from the core thread such that a spacing between distal ends of the piles about the circumference of the core thread is larger than a spacing between proximal ends of the piles proximate to the core thread.

15. The toothed cable according to claim 14, wherein the core thread is disposed close to one of the side walls in the groove.

16. A cable device comprising the toothed cable according to claim 14.

17. A cable device comprising the toothed cable according to claim 15.

18. A system for moving a moving object comprising the cable device according to claim 16.

19. A system for moving a moving object comprising the cable device according to claim 17.

20. The toothed cable according to claim 14, further comprising a meltable filament thread disposed in the groove to join the strand to the core cable.

* * * * *